(12) United States Patent
Hirotani

(10) Patent No.: US 10,436,334 B2
(45) Date of Patent: Oct. 8, 2019

(54) CHECK VALVE

(71) Applicant: TLV CO., LTD., Hyogo (JP)

(72) Inventor: Masahisa Hirotani, Kakogawa (JP)

(73) Assignee: TLV CO., LTD., Hyogo (JP)

( * ) Notice: Subject to any disclaimer, the term of this patent is extended or adjusted under 35 U.S.C. 154(b) by 0 days.

(21) Appl. No.: 15/595,046

(22) Filed: May 15, 2017

(65) Prior Publication Data
US 2017/0248242 A1    Aug. 31, 2017

Related U.S. Application Data

(63) Continuation of application No. PCT/JP2015/082146, filed on Nov. 16, 2015.

(30) Foreign Application Priority Data

Nov. 17, 2014 (JP) .................................. 2014-232685

(51) Int. Cl.
*F16K 15/02* (2006.01)
*E03F 5/042* (2006.01)
(Continued)

(52) U.S. Cl.
CPC .............. *F16K 15/02* (2013.01); *E03F 5/042* (2013.01); *F16K 15/028* (2013.01); *E03C 1/288* (2013.01);
(Continued)

(58) Field of Classification Search
CPC .. F16K 15/023; F16K 15/028; F16K 17/0413; F16K 15/026; F16K 15/02; E03F 5/042; E03F 2005/0417
See application file for complete search history.

(56) References Cited

U.S. PATENT DOCUMENTS 886,045 A * 4/1908 Ehrlich ..................... F17C 1/14
137/543.19
2,254,209 A * 9/1941 Buttner et al. ........ F16K 15/026
137/540
(Continued)

FOREIGN PATENT DOCUMENTS

CN    203 082 279 U    7/2013
DE    198 23 310 A1    12/1999
(Continued)

OTHER PUBLICATIONS

International Search Report issued in PCT/JP2015/082146; dated Feb. 9, 2016.
(Continued)

*Primary Examiner* — Reinaldo Sanchez-Medina
*Assistant Examiner* — Nicole Gardner
(74) *Attorney, Agent, or Firm* — Studebaker & Brackett PC

(57) ABSTRACT

A check valve includes a plate-shaped valve seat member provided with a fluid discharge port, a plate-shaped valve member provided on a downstream side of the valve seat member and configured to open/close the discharge port, a coil spring provided on a downstream side of the valve member and configured to bias the valve member toward the discharge port, a spring receiving member provided for the coil spring on a downstream side thereof, and a plurality of guide rods provided at the periphery of the valve member and formed to extend in an upstream-to-downstream flow direction, each having a downstream end portion attached to the spring receiving member, and configured to guide the valve member in the upstream-to-downstream flow direction.

1 Claim, 4 Drawing Sheets

(51) Int. Cl.
  *F04B 39/10* (2006.01)
  *F16K 15/06* (2006.01)
  *F16K 15/16* (2006.01)
  *F16K 15/18* (2006.01)
  *E03C 1/288* (2006.01)
  *E03C 1/298* (2006.01)
(52) U.S. Cl.
  CPC ............... *E03C 1/298* (2013.01); *F04B 39/10* (2013.01); *F16K 15/06* (2013.01); *F16K 15/16* (2013.01); *F16K 15/18* (2013.01)

(56) References Cited

U.S. PATENT DOCUMENTS

| | | | | |
|---|---|---|---|---|
| 2,649,277 | A * | 8/1953 | Blackford | F16K 15/028 137/454.5 |
| 2,694,411 | A * | 11/1954 | Ponsar | F16K 17/0413 137/543.17 |
| 2,710,023 | A | 6/1955 | Blackford et al. | |
| 2,965,126 | A * | 12/1960 | Hallinan | E03F 5/042 137/410 |
| 3,084,709 | A * | 4/1963 | Flick | F15B 11/0413 137/269.5 |
| 3,456,684 | A * | 7/1969 | Sochting | F04B 39/10 137/543.17 |
| 3,461,905 | A * | 8/1969 | McCabe | F16K 15/00 137/315.33 |
| 3,913,615 | A * | 10/1975 | Cooper | F16K 15/028 137/543.19 |
| 4,140,148 | A * | 2/1979 | Richter | B65D 51/1644 137/240 |
| 5,193,579 | A * | 3/1993 | Bauer | B01D 35/147 137/540 |
| 5,546,981 | A * | 8/1996 | Li | F16K 15/028 137/493.3 |
| 6,085,779 | A * | 7/2000 | Eriksson | E03F 5/0408 137/362 |
| 6,435,848 | B1 * | 8/2002 | Minami | F04B 27/1804 137/514.5 |
| 7,581,560 | B2 * | 9/2009 | Koch | F16K 15/026 137/513.3 |
| 8,137,080 | B2 * | 3/2012 | Kock | F04C 29/126 417/410.4 |
| 9,278,641 | B2 * | 3/2016 | Do Van | B60P 7/065 |
| 2014/0202556 | A1 | 7/2014 | Do Van | |

FOREIGN PATENT DOCUMENTS

| | | |
|---|---|---|
| DE | 10 2007 039 025 A1 | 2/2009 |
| JP | S60-078987 U | 6/1985 |
| JP | 2003-301954 A | 10/2003 |
| JP | 2005-054954 A | 3/2005 |
| JP | 2013-185386 A | 9/2013 |

OTHER PUBLICATIONS

The extended European search report issued by the European Patent Office dated Jun. 13, 2018, which corresponds to EP15860418.1-1002 and is related to U.S. Appl. No. 15/595,046.

An Office Action mailed by the Japanese Patent Office dated Jan. 8, 2019, which corresponds to Japanese Patent Application No. 2016-560218 and is related to US. Appl. No. 15/595,046.

An Office Action, "Noticification of Reasons for Refusal" mailed by the Japanese Patent Office dated Apr. 9, 2019, which corresponds to Japanese Patent Application No. 2016-560218 and is related to U.S. Appl. No. 15/595,046 with English Translation.

\* cited by examiner

FIG.1

CHECK VALVE

CROSS-REFERENCE TO RELATED APPLICATION

This is a continuation of PCT International Application PCT/JP2015/082146 filed on Nov. 16, 2015, which claims priority to Japanese Patent Application No. 2014-232685 filed on Nov. 17, 2014. The disclosures of these applications including the specifications, the drawings, and the claims are hereby incorporated by reference in their entirety.

FIELD

The present application relates to a check valve provided at a drain funnel on a floor etc.

BACKGROUND

A check valve provided at a drain funnel (a floor drain funnel) has been known as disclosed in, e.g., Japanese Patent Publication No. 2013-185386. The drain funnel is provided on, e.g., a floor of a factory, and is for discharging, to the outside, fluid such as contaminated water spilled or discharged over a floor surface. The drain funnel includes a storage tank (a recess) buried on the floor, and a discharge pipe (a water discharge pipe) provided at a bottom portion of the storage tank. In addition, the check valve is provided at the discharge pipe. The check valve includes an annular valve seat member, a spherical float, a plurality of guide rods (support bolts), and support members. The guide rods are arranged at the periphery of the float, and are configured to guide upper-to-lower movement of the float. The support member is provided at a lower end portion of each guide rod, and is configured to constrain the lower position of the float. When fluid flows back in the discharge pipe, the float is, in the check valve, lifted (floated) by the fluid, and then, seats on the valve seat member. In this manner, the backflow of the fluid is reduced or prevented. In other normal states than the backflow state, the float is unseated from the valve seat member, and is supported by the support members. With this configuration, e.g., the fluid discharged over the floor surface flows into the storage tank, and then, is discharged through the discharge pipe.

SUMMARY

In the check valve as described in Japanese Patent Publication No. 2013-185386, a fluid discharge amount is relatively small, and for this reason, it has been demanded that a sufficient discharge amount is ensured.

The technique disclosed in the present application has been made in view of the above-described situation, and is intended to provide a check valve capable of ensuring a sufficient discharge amount in a drain funnel.

The technique disclosed in the present application relates to a check valve including a valve seat member, a valve member, a spring, a spring receiving member, and a plurality of guide rods. The valve seat member is provided with a fluid circulation port. The valve member is a plate-shaped member provided on a downstream side of the valve seat member and configured to open/close the circulation port. The spring is provided on a downstream side of the valve member, and is configured to bias the valve member toward the circulation port. The spring receiving member is a spring receiving member provided for the spring on a downstream side thereof. The plurality of guide rods are provided at the periphery of the valve member and formed to extend in an upstream-to-downstream flow direction, each have a downstream end portion attached to the spring receiving member, and are configured to guide the valve member in the upstream-to-downstream flow direction.

According to the check valve of the present application, the valve member configured to open/close the circulation port of the valve seat member is formed in a plate shape. Thus, as compared to the case of opening/closing by a typical spherical float (a valve member), the circulation port can be formed larger. In an embodiment in which a circulation port is opened/closed by a spherical float (i.e., an embodiment in which the circulation port is closed by a spherical surface), the size of the circulation port needs to be formed extremely smaller than that of the float in terms of preventing the float from being stuck in the circulation port. For this reason, when a check valve is provided at, e.g., a pipe, the size of the circulation port is extremely small with respect to a pipe diameter. Thus, a discharge amount corresponding to the pipe diameter cannot be ensured. In this regard, the circulation port is closed by the plate-shaped valve member in the check valve of the present application, and therefore, it is sufficient that the size of the circulation port is slightly smaller than that of the valve member. As a result, a sufficient discharge amount corresponding to the pipe diameter can be ensured.

BRIEF DESCRIPTION OF THE DRAWINGS

FIG. 1 is a cross-sectional view of an outline configuration of a check valve of a first embodiment.

DESCRIPTION OF EMBODIMENTS

Figure 2:
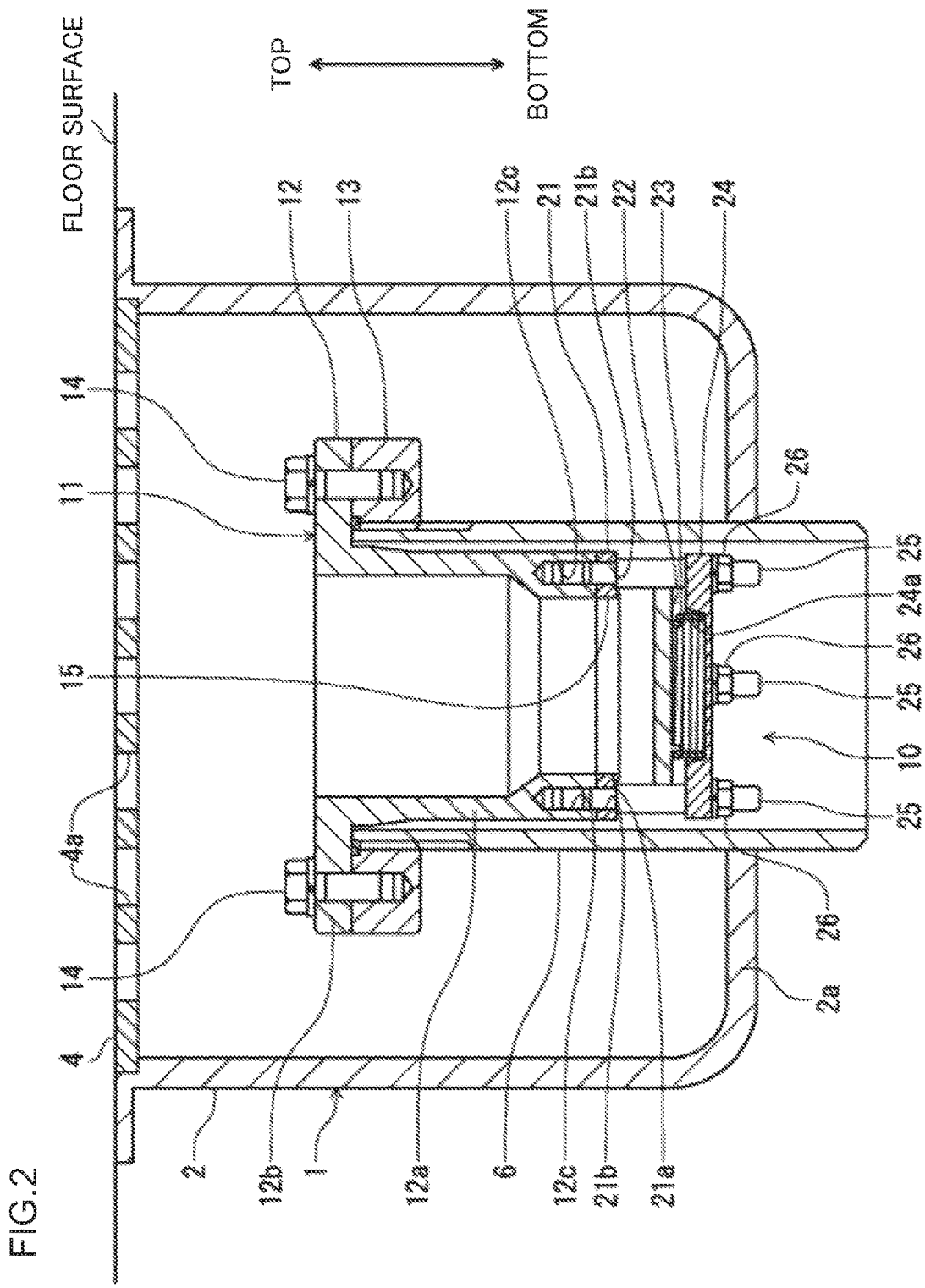
FIG. 2 is a view of an open state of the check valve of the first embodiment, the view corresponding to FIG. 1.

Embodiments of the present application will be described below with reference to the drawings. Note that the embodiments described below will be set forth as preferable embodiments in nature, and are not intended to limit the technique disclosed in the present application, applications of the technique, or the scope of use of the technique.

(First Embodiment)

A first embodiment of the present application will be described with reference to FIGS. 1 to 3. A check valve 10 of the present embodiment is used for a drain funnel 1 provided on, e.g., a floor of a factory. The drain funnel 1 is for discharging, to the outside, fluid such as contaminated water spilled or discharged over a floor surface.

Figure 1:
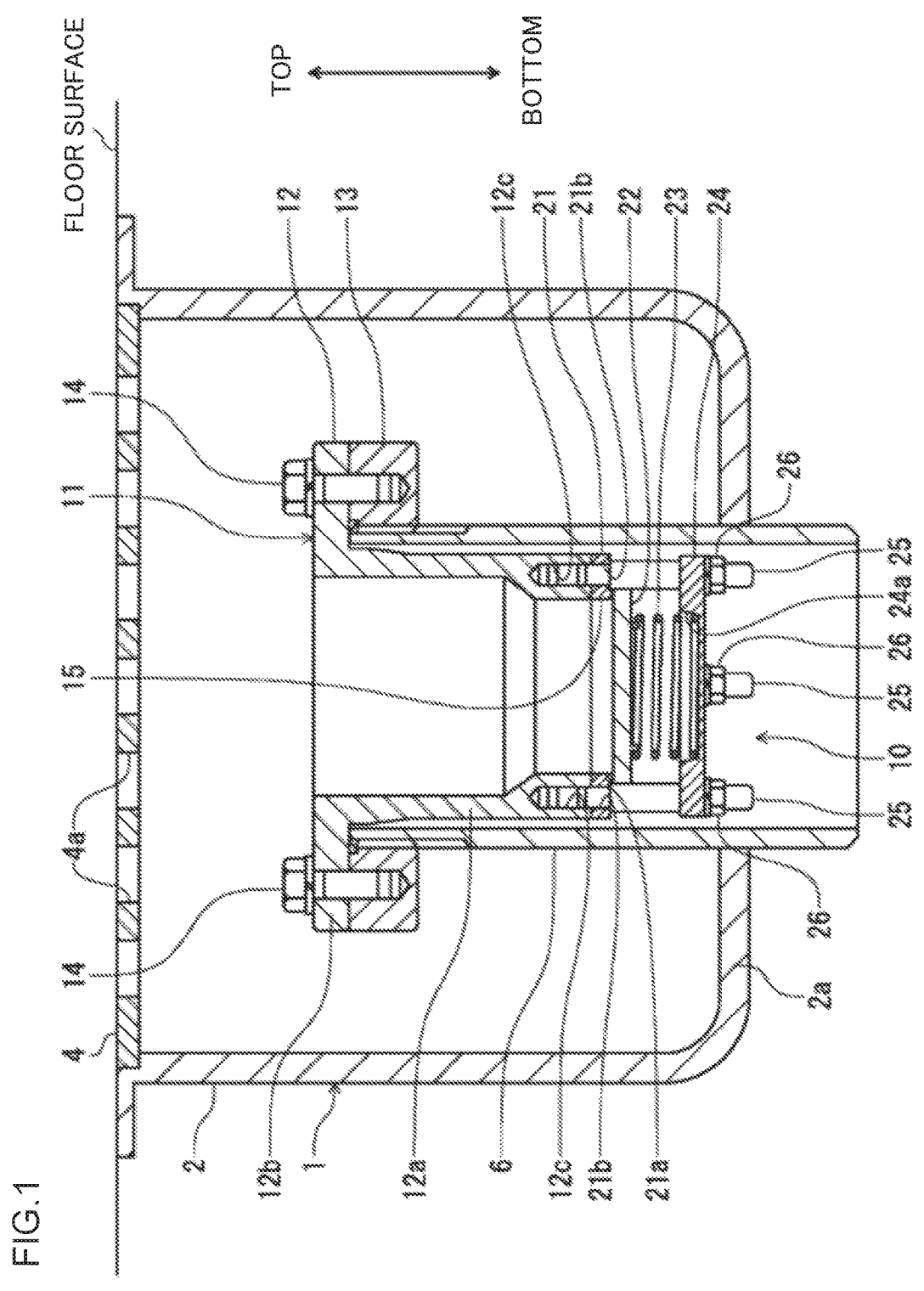

As illustrated in FIG. 1, the drain funnel 1 includes a storage tank 2 and a discharge pipe 6. The storage tank 2 is a container with an upper opening portion, and is buried on the floor with an upper opening end of the storage tank 2 being flush with the floor surface. An upper opening of the storage tank 2 is closed by a lid 4, and the lid 4 is provided with many through-holes 4a. The storage tank 2 is in a circular or quadrangular shape as viewed in the plane, for example. The discharge pipe 6 is provided to penetrate a bottom wall 2a of the storage tank 2 with the discharge pipe 6 extending in an upper-to-lower direction. That is, the discharge pipe 6 is provided such that an upper end thereof protrudes from the bottom wall 2a of the storage tank 2. In the drain funnel 1, e.g., fluid discharged over the floor surface flows into the storage tank 2 through the through-holes 4a of the lid 4, and is stored in the storage tank 2. Then, the stored fluid is discharged to the outside through the discharge pipe 6.

Figure 3:
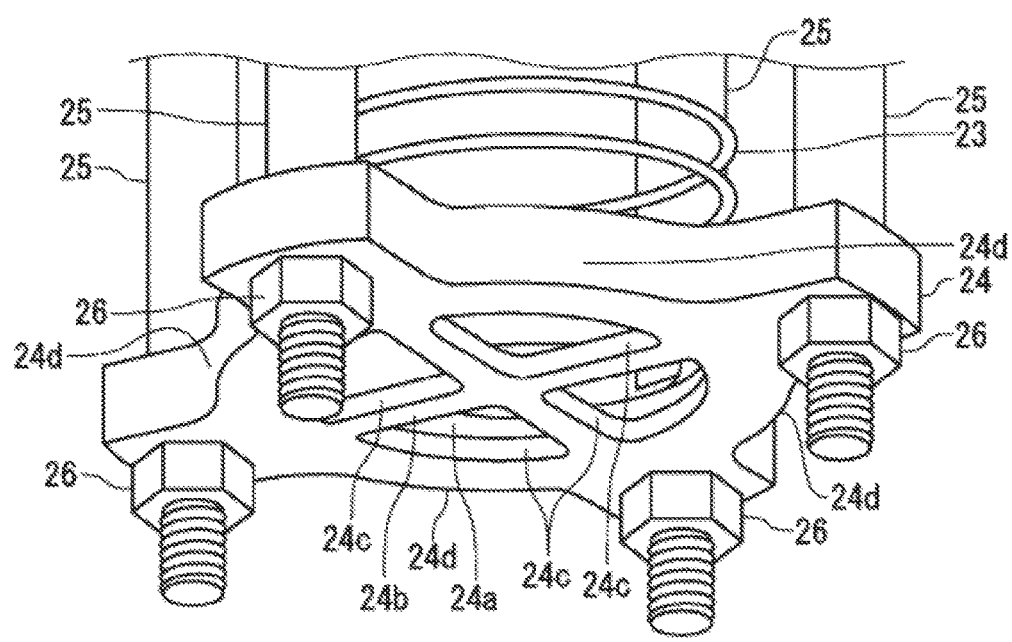
FIG. 3 is a perspective view of a spring receiving member of the check valve of the first embodiment as viewed from below.

As illustrated in FIGS. 1 and 2, the check valve 10 of the present embodiment is provided at the discharge pipe 6. The check valve 10 includes an attachment member 11, a valve seat member 21, a valve member 22, a coil spring 23 (a spring), a spring receiving member 24, and a plurality of guide rods 25 (four in the present embodiment).

The attachment member 11 is for attaching, e.g., the valve seat member 21 and the valve member 22 to the discharge pipe 6. The attachment member 11 includes an insertion member 12 and a threadedly-engagement member 13. The threadedly-engagement member 13 is an annular member with an inner peripheral surface provided with an internal thread portion, and is attached with the threadedly-engagement member 13 being threadedly engaged with the outer periphery of an upper portion of the discharge pipe 6. The insertion member 12 includes a tubular portion 12a extending in the upper-to-lower direction, and a flange 12b provided at an upper end of the tubular portion 12a. The tubular portion 12a is formed in a cylindrical shape having a diameter slightly smaller than the inner diameter of the discharge pipe 6, and is inserted into the discharge pipe 6 from above. The tubular portion 12a and the discharge pipe 6 are coaxially arranged. The flange 12b of the insertion member 12 is fixed to the threadedly-engagement member 13 with bolts 14 with the tubular portion 12a being inserted into the discharge pipe 6. Note that the outer diameter of the flange 12b and the outer diameter of the threadedly-engagement member 13 are substantially the same as each other.

The valve seat member 21 is a circular plate member, and is fixed to a lower end surface of the insertion member 12 with the guide rods 25. In the insertion member 12, a lower end portion thereof is thicker than other portions. The outer and inner diameters of the valve seat member 21 are substantially the same as the outer and inner diameters of the lower end portion of the insertion member 12. An opening of the valve seat member 21 and an opening of the tubular portion 12a of the insertion member 12 together form a fluid discharge port 15 (a circulation port of the claims of the present application). In the valve seat member 21, an inner edge portion thereof serves as a circular valve seat 21a slightly protruding downward (a downstream side).

The valve member 22 is formed in a discoid shape. The valve member 22 is provided below (the downstream side) the valve seat member 21, and is configured to open/close the discharge port 15 (the opening of the valve seat member 21). That is, the valve member 22 closes the discharge port 15 by seating on the valve seat 21a of the valve seat member 21 (a state illustrated in FIG. 1), and opens the discharge port 15 by unseating from the valve seat 21a (a state illustrated in FIG. 2).

The coil spring 23 is provided below (the downstream side) the valve member 22, and is configured to bias the valve member 22 toward the opening of the valve seat member 21. A first end of the coil spring 23 contacts a lower surface of the valve member 22, and a second end of the coil spring 23 is supported by the spring receiving member 24. That is, the spring receiving member 24 is provided below (the downstream side) the coil spring 23, and the second end of the coil spring 23 is inserted into a recess 24a formed at the center of the spring receiving member 24.

Four guide rods 25 are circular rod members. Four guide rods 25 are provided to extend in the upper-to-lower direction (an upstream-to-downstream flow direction). Four guide rods 25 are provided at the periphery of the valve member 22. Specifically, four guide rods 25 are arranged at equal interval (90° interval) in a circumferential direction of the valve member 22. Each guide rod 25 is inserted into an insertion hole 21b (the periphery of the opening) formed at the valve seat member 21, and then, is fastened and attached to a screw hole 12c formed at the insertion member 12. Each guide rod 25 attached as described above is configured to contact an outer peripheral surface of the valve member 22 to guide the valve member 22 in the upper-to-lower direction (the upstream-to-downstream flow direction). That is, the guide rods 25 constrain operation of the valve member 22 in the horizontal direction, and allow only upper-to-lower movement (movement in the upper-to-lower direction) of the valve member 22.

Moreover, the spring receiving member 24 is attached to lower end portions (downstream end portions) of the guide rods 25. The spring receiving member 24 is formed in a substantially discoid shape. As illustrated in FIG. 3, an external thread portion is formed at the lower end portion of each guide rod 25, and the spring receiving member 24 is fixed with nuts 26 with the lower end portion of each guide rod 25 being inserted into the spring receiving member 24. In the spring receiving member 24, a bottom wall 24b of the recess 24a receiving the second end of the coil spring 23 is provided with a plurality of openings 24c (four in the present embodiment). Moreover, the spring receiving member 24 is provided with four cutout portions 24d each formed by cutting out of an outer edge portion between adjacent ones of the guide rods 25. In the spring receiving member 24, these openings 24c and these cutout portions 24d form a fluid circulation path.

In the drain funnel 1 described above, e.g., fluid discharged over the floor surface flows into the storage tank 2 through the through-holes 4a, and is stored in the storage tank 2. When a storage level in the storage tank 2 is elevated to an upper surface of the insertion member 12, the fluid flows into the insertion member 12. Then, when a liquid surface is elevated to a predetermined height (e.g., the upper surface of the insertion member 12) in the insertion member 12, the valve member 22 is displaced downward (the downstream side) and unseated, and then, the discharge port 15 (the opening of the valve seat member 21) opens. With this configuration, the fluid in the storage tank 2 is discharged to the outside through the discharge pipe 6. When the fluid flows back in the discharge pipe 6, the valve member 22 is displaced upward (an upstream side) and seated, and therefore, the discharge port 15 is closed. Thus, the backflow of the fluid is reduced or prevented.

According to the check valve 10 of the above-described embodiment, the valve member 22 configured to open/close the opening (the circulation port) of the valve seat member 21 is formed in a plate shape. Thus, as compared to the case of opening/closing by a typical spherical float (a valve member), the opening of the valve seat member 21 can be formed larger. In an embodiment in which an opening of a valve seat member is opened/closed by a spherical float (i.e., an embodiment in which the opening is closed by a spherical surface), the size of the opening needs to be formed extremely smaller than that of the float in terms of preventing the float from being stuck in the opening. For this reason, the size of the opening of the valve seat member is extremely small with respect to the inner diameter of a discharge pipe, and therefore, a discharge amount corresponding to the inner diameter of the discharge pipe cannot be ensured. On the other hand, in the check valve 10 of the above-described embodiment, the opening of the valve seat member 21 is closed by the plate-shaped valve member 22, and therefore, it is sufficient that the size of such an opening is slightly smaller than that of the valve member 22. With this configuration, a sufficient discharge amount corresponding to the inner diameter of the discharge pipe 6 can be ensured.

Moreover, according to the check valve 10 of the above-described embodiment, the plurality of guide rods 25 are inserted and attached at the periphery of the opening of the valve seat member 21. That is, in the above-described embodiment, the valve seat member 21 and the guide rods 25 are integrally assembled. Thus, the axial center of the opening (the circulation port) of the valve seat member 21 and the center among four guide rods 25 can be accurately aligned to each other. With this configuration, the axial center of the opening of the valve seat member 21 and the axial center of the valve member 22 can be accurately aligned to each other. Thus, the opening of the valve seat member 21 can be reliably closed by the valve member 22. That is, the accuracy of opening/closing the valve member 22 can be enhanced.

Further, the axial centers of the valve seat member 21 and the valve member 22 can be accurately aligned to each other. In other words, the axial centers of the valve seat member 21 and the valve member 22 do not shift from each other. Thus, by the size of the opening (the circulation port) of the valve seat member 21 can be formed closer to the size of the valve member 22. With this configuration, the opening of the valve seat member 21 can be formed larger, and the fluid discharge amount can be increased.

In addition, in the check valve 10 of the above-described embodiment, the cutout portions 24d each formed by cutting out of the outer edge portion are formed at the spring receiving member 24, and therefore, a fluid circulation area can be ensured. With this configuration, a greater fluid discharge amount can be ensured.

Moreover, in the check valve 10 of the above-described embodiment, it is configured such that the spring receiving member 24 is fixed with the nuts 26 with the spring receiving member 24 being inserted onto the lower end portions of the guide rods 25, and therefore, the position (the position in the upper-to-lower direction) of the spring receiving member 24 can be adjusted. With this configuration, biasing force of the coil spring 23 on the valve member 22 can be easily adjusted. The biasing force of the coil spring 23 increases when the position of the spring receiving member 24 is lifted, and decreases when the position of the spring receiving member 24 is lowered.

(Second Embodiment)

A second embodiment of the present application will be described with reference to FIG. 4. A check valve 10 of the present embodiment is attached to a storage tank 3 instead of being attached to the discharge pipe 6 in the first embodiment.

Figure 4:
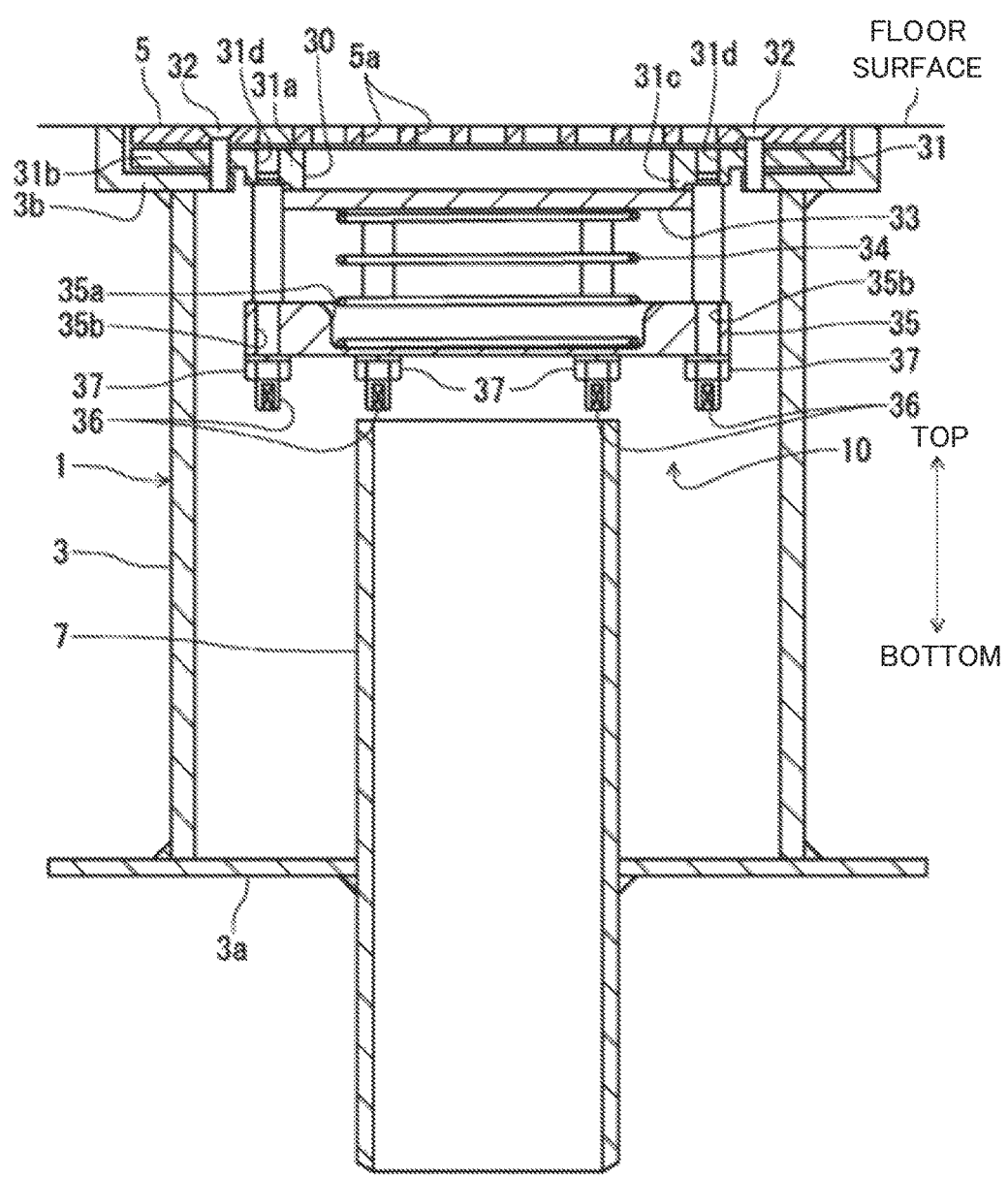
FIG. 4 is a cross-sectional view of an outline configuration of a check valve of a second embodiment.

As illustrated in FIG. 4, a drain funnel 1 also includes the storage tank 3 and a discharge pipe 7 in the present embodiment. The storage tank 3 is a container with an upper opening portion, and is buried on a floor with an upper opening end of the storage tank 3 being flush with a floor surface. An upper opening of the storage tank 3 is closed by a lid 5, and the lid 5 is provided with many through-holes 5a. The discharge pipe 7 is provided to penetrate a bottom wall 3a of the storage tank 3 with the discharge pipe 7 extending in an upper-to-lower direction. That is, the discharge pipe 7 is, as in the first embodiment described above, provided such that an upper end thereof protrudes from the bottom wall 3a of the storage tank 3.

The check valve 10 of the present embodiment is attached to the upper opening of the storage tank 3. The check valve 10 includes a valve seat member 31, a valve member 33, a coil spring 34 (a spring), a spring receiving member 35, and a plurality of guide rods 36 (six in the present embodiment). Unlike the first embodiment described above, no attachment member is provided in the present embodiment.

The valve seat member 31 is a circular plate member, and has an inner-peripheral-side base portion 31a and an outer-peripheral-side thin portion 31b. The thin portion 31b is thinner than the base portion 31a. The valve seat member 31 is fixed with countersunk screws 32 with the thin portion 31b being sandwiched between a flange 3b of the storage tank 3 and the lid 5. An opening of the valve seat member 31 forms an inlet port 30 (a circulation port of the claims of the present application). In the valve seat member 31, an inner edge portion thereof serves as a circular valve seat 31c slightly protruding downward (a downstream side).

The valve member 33 is formed in a discoid shape. The valve member 33 is provided below (the downstream side) the valve seat member 31, and is configured to open/close the inlet port 30 (the opening of the valve seat member 31). That is, the valve member 33 closes the inlet port 30 by seating on the valve seat 31c of the valve seat member 31 (a state illustrated in FIG. 4), and opens the inlet port 30 by unseating from the valve seat 31c (a state not shown).

The coil spring 34 is provided below (the downstream side) the valve member 33, and is configured to bias the valve member 33 toward the inlet port 30 (the opening of the valve seat member 31). A first end of the coil spring 34 contacts a lower surface of the valve member 33, and a second end of the coil spring 34 is supported by the spring receiving member 35. That is, the spring receiving member 35 is provided below (the downstream side) the coil spring 34, and the second end of the coil spring 34 is inserted into a recess 35a formed at the center of the spring receiving member 35.

Six guide rods 36 are circular rod members. Six guide rods 36 are provided to extend in the upper-to-lower direction (an upstream-to-downstream flow direction). Six guide rods 36 are provided at the periphery of the valve member 33. Specifically, six guide rods 36 are arranged at equal interval (60° interval) in a circumferential direction of the valve member 33. Each guide rod 36 is fastened (inserted) and attached to a screw hole 31d (the periphery of the opening) formed at the valve seat member 31. Each guide rod 36 attached as described above is configured to contact an outer peripheral surface of the valve member 33 to guide the valve member 33 in the upper-to-lower direction (the upstream-to-downstream flow direction). That is, the guide rods 36 constrain operation of the valve member 33 in the horizontal direction, and allow only upper-to-lower movement (movement in the upper-to-lower direction) of the valve member 33.

As in the first embodiment described above, the spring receiving member 35 is attached to lower end portions (downstream end portions) of the guide rods 36. The spring receiving member 35 is formed in a substantially discoid shape. An external thread portion is formed at the lower end portion of each guide rod 36, and the spring receiving member 35 is fixed with nuts 37 with the lower end portion of each guide rod 36 being inserted into an insertion hole 35b of the spring receiving member 35. In the spring receiving member 35 of the present embodiment, a plurality of openings are, although not shown in the figure, also formed at a bottom wall of the recess 35a, and a plurality of cutout portions are each formed by cutting out of an outer edge portion between adjacent ones of the guide rods 36. In the spring receiving member 35, these openings and these cutout portions form a fluid circulation path.

In the drain funnel 1 of the present embodiment, when, e.g., a liquid surface of fluid discharged over the floor surface reaches a predetermined height, the valve member 33 is displaced downward (the downstream side) and unseated, and then, the inlet port 30 opens. With this configuration, the fluid accumulated on the floor surface flows into the storage tank 3 through the through-holes 5a and the inlet port 30. A portion of the fluid having flowed into the storage tank 3 is stored in the storage tank 3, and the remaining fluid is discharged to the outside through the discharge pipe 7. When the liquid surface of the fluid stored in the storage tank 3 reaches an upper end of the discharge pipe 7, the fluid is discharged through the discharge pipe 7. When the fluid flows back in the discharge pipe 7, the valve member 33 is displaced upward (an upstream side) and seated, and therefore, the inlet port 30 is closed. Thus, the backflow of the fluid is reduced or prevented. In the check valve 10 of the present embodiment, features and advantageous effects similar to those of the first embodiment described above can be provided.

Note that the number of the guide rods 25, 36 is not limited to that in each embodiment described above.

The technique disclosed in the present application is useful for a check valve used for a drain funnel.

What is claimed:

1. A check valve comprising:
   a valve seat member provided with a fluid circulation port;
   a round plate-shaped valve member provided on a downstream side of the valve seat member and configured to open/close the circulation port;
   a spring provided on a downstream side of the valve member and configured to bias the valve member toward the circulation port;
   a spring receiving member provided for the spring on a downstream side thereof; and
   a plurality of round guide rods
      provided at a periphery of the valve member and formed to extend in an upstream-to-downstream flow direction,
      each having a downstream end portion attached to the spring receiving member, and
      each being in contact with an outer circumferential surface of the valve member to thereby guide the valve member in the upstream-to-downstream flow direction,
   wherein an upstream end portion of each guide rod is inserted into a periphery of the circulation port of the valve seat member and attached to a screw hole of an insertion member,
   the spring receiving member is fixed with nuts with a lower end portion of each guide rod being inserted into the spring receiving member,
   the spring receiving member has a recess which is formed at a center of the spring receiving member and into which a downstream end portion of the spring is inserted,
   a bottom wall of the recess is provided with a plurality of openings forming a fluid circulation path,
   a threadedly-engagement member is directly threadedly engaged with an outer periphery of a discharge pipe, and
   the insertion member is inserted into the discharge pipe and fixed to the threadedly-engagement member with bolts.

* * * * *